United States Patent [19]

Sweeney

[11] 4,326,378
[45] Apr. 27, 1982

[54] FILTER FOR AN INTERNAL COMBUSTION ENGINE HAVING REJUVENATION CAPABILITIES

[75] Inventor: William M. Sweeney, Wappingers Falls, N.Y.

[73] Assignee: Texaco Inc., White Plains, N.Y.

[21] Appl. No.: 117,324

[22] Filed: Jan. 31, 1980

[51] Int. Cl.³ ............................................. F01N 3/02
[52] U.S. Cl. ........................................ 60/311; 60/277; 60/298; 60/300; 60/302; 55/282; 55/466; 55/DIG. 30
[58] Field of Search .................. 60/298, 300, 311, 277, 60/302; 55/DIG. 30, 282, 466, DIG. 10

[56] References Cited

U.S. PATENT DOCUMENTS

| | | | |
|---|---|---|---|
| 3,248,872 | 5/1966 | Morrell | 60/298 |
| 3,503,716 | 3/1970 | Berger | 60/277 |
| 3,729,936 | 5/1973 | Palma | 60/301 |
| 3,779,015 | 12/1973 | Maruoka | 60/300 |
| 3,872,666 | 3/1975 | Bentley | 60/302 |
| 4,205,971 | 6/1980 | Abthoff | 60/311 |
| 4,217,757 | 8/1980 | Crone | 55/DIG. 30 |
| 4,224,285 | 9/1980 | Mayer | 55/DIG. 30 |

FOREIGN PATENT DOCUMENTS

| | | | |
|---|---|---|---|
| 1314504 | 4/1973 | United Kingdom | 60/301 |
| 1402714 | 8/1975 | United Kingdom | 60/302 |

*Primary Examiner*—Douglas Hart
*Attorney, Agent, or Firm*—Carl G. Ries; Robert A. Kulason; Robert B. Burns

[57] ABSTRACT

A filter adapted to connect to an internal combustion engine in relatively close proximity to the engine. The filter will receive a stream of hot exhaust gas immediately as the latter passes from the engine's combustion chambers. The gas then passes through a filter bed disposed within a manifold system incorporated into the filter. The filter bed includes means for stabilizing the temperature thereof within a desired range, regardless of the operating condition of the engine, and the temperature of exhaust gas.

7 Claims, 2 Drawing Figures

FILTER FOR AN INTERNAL COMBUSTION ENGINE HAVING REJUVENATION CAPABILITIES

BACKGROUND OF THE INVENTION

In an internal combustion engine, it is desirable to treat the exhaust gases so that they can be discharged in a relatively safe condition into the atmosphere. In some engines, particularly of the diesel type, among the greatest operating problems is the presence of solid particles which are carried from the engine in the hot exhaust gas stream.

These particles are normally bits of combustible carbon. They result from the incomplete combustion of hydrocarbon fuels under particular engine operating conditions. However, the operating efficiency of the engine is also a contributing factor to the amount of the carbon which will be produced during the combustion event.

The presence of relatively large amounts of carbon particles in any exhaust stream is evidenced by a dark, smoky effluent. Such smoke is not only offensive to the smell; in large quantities it can be unhealthy.

Means have been provided, and are known to the prior art, for the elimination or minimization of the carbon content in any exhaust gas stream. However, it has been found that while the carbon particles can be eliminated by a suitable filter of proper construction, eventually the latter can become saturated and/or inoperable due to excess carbon accumulation.

It should be appreciated that generation of carbon particles in an exhaust gas stream is prevalent under virtually all diesel engine operating conditions. It is further appreciated that the quantity and quality of the exhaust gas stream created in any internal combustion engine will vary in accordance with the operating characteristics of the engine.

For one thing, the temperature range experienced by the diesel exhaust gas stream can vary between slightly lower than ambient temperature, and temperature in excess of 1500° F.

When the gas exits from the engine at such a high temperature, the combustible carbon particles within the stream will generally be ignited and discharged into the atmosphere in gaseous form. This ignition of the carbon particles will continue even though the engine operation temperature drops down to as low as 650° F.

Where, however, it is found that the engine operates continuously under such circumstances that carbon is continuously produced and accumulated in the filter, the latter must be occasionally rejuvenated. Under usual circumstances, rejuvenation will merely consist of introducing the hot exhaust gas stream into the filter itself to contact carbon which has been retained in the latter. This is achieved however, only so long as the gas is above the carbon ignition temperature.

The combustion of any large, and contained carbon accumulation can, and will often produce temperatures beyond that of the exhaust gas. The result is that at such excessive temperatures the filter is susceptible to thermal shock and perhaps even to damage such as being distorted, or weakened in other ways.

Toward overcoming the above noted problems particularly in diesel engine operation, the present invention provides the means for minimizing thermal shock and possible damage. In the instant arrangement, the particle filtering bed is disposed as near as possible to the engine's hot exhaust gas passages. Preferably, the filter is positioned to receive the exhaust gas stream as the latter leaves the engine combustion chambers.

In such a position, the filter will always receive exhaust gas at or near its maximum temperature. Even at initial engine start-up, when the gas is relatively cool and incapable of initiating combustion of the particles, the filter bed will commence being heated to an operating condition.

In a relatively short period of time, usually when the engine begins to operate normally, the filter bed will become sufficiently hot to burn off retained particles. However, such burning is regulated or controlled, by injecting a stream of a gaseous coolant into the bed.

Thereafter, as the engine operates under different known loading conditions, the temperature of exhaust gas will vary between about 400° to 1500° F. With the present arrangement for heating and/or cooling the filter bed, the latter will be maintained in a relatively stable condition and within a desired temperature range.

Thus, during the engine warm-up period or when it is operating under light load conditions and the exhaust gas comes out at a relatively low temperature, the gas stream will be preheated by an electrically actuated heater coil within the filter. This heating step arrangement is periodically brought to function in response to a particular condition of the gas within the filter bed.

Means is further provided for introducing a coolant, such as air, into the filter bed. Thus, the heating and cooling functions can be alternately activated thereby to maintain the bed within a desired temperature range deemed to best preserve the filter's integrity.

By so regulating and stabilizing the temperature of the exhaust gas within the filter bed, the latter is preserved from thermal or physical damage. Further, it is permitted to operate in a most efficient manner by substantially eliminating the presence of carbon in the engine exhaust gas stream.

It is therefore an object of the invention to provide an exhaust gas system which is capable of filter rejuvenation. A further object is to provide a filter rejuvenation means which is capable of continuous operation whereby to avoid a build-up within the filter of combustible particles. A still further object is to provide a system which is capable of adjusting to engine operating conditions whereby to avoid any excess in particle build-up which might eventually result in excessive temperatures within the filter body.

Figure 1:
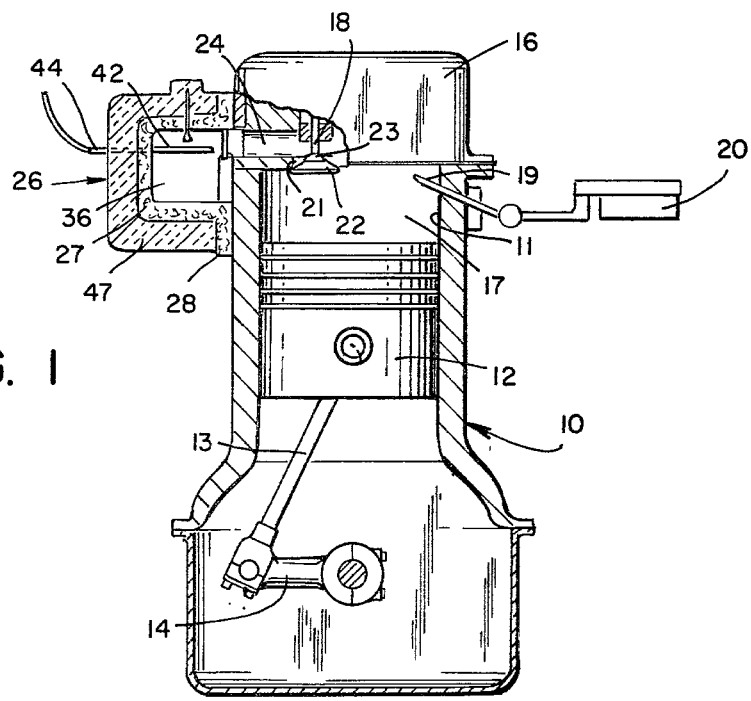
FIG. 1 illustrates a top view of the invention shown partially in cross section.
Figure 2:
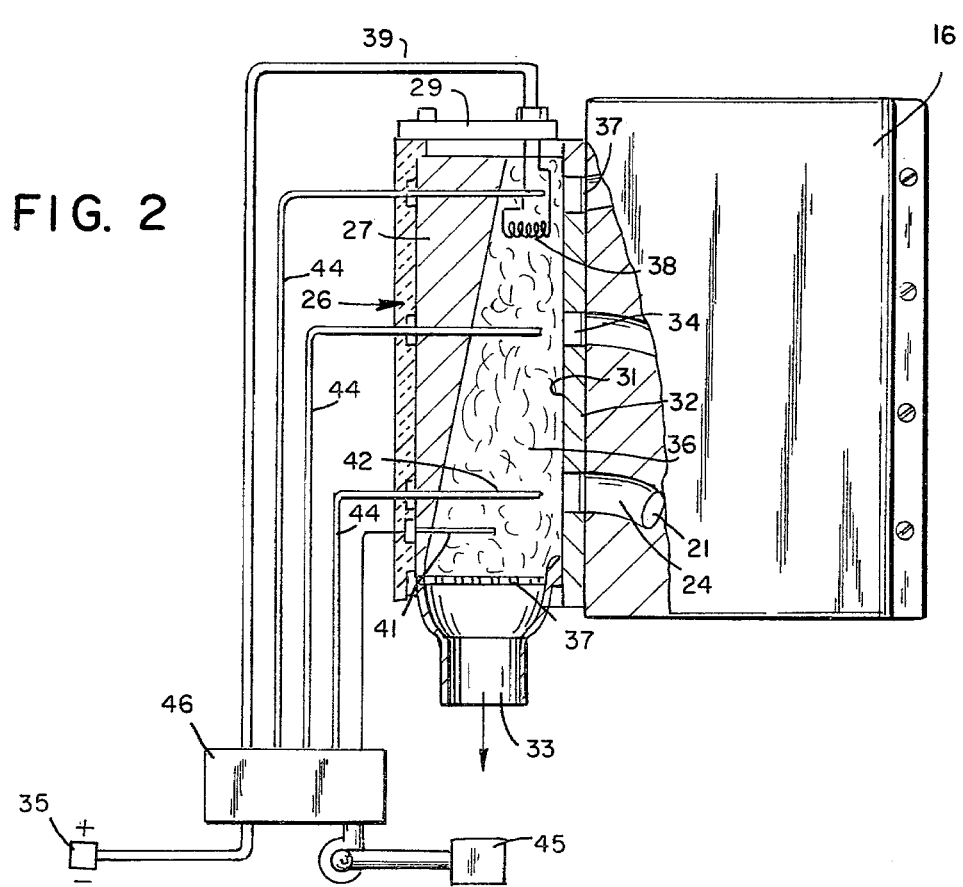
FIG. 2 is a cross section taken along line A—A in FIG. 1.

Referring to the drawings, an engine 10 of the type presently contemplated, might be of the ordinary spark ignited type, or of the diesel type with fuel injection. For the present purposes, it will be assumed that the engine is provided with a fuel injection system such that a relatively constant volume of air is always induced into the engine. The latter is then responsive to the amount of fuel injected to meet specific loading conditions.

Engine 10 includes generally a cast block wherein a plurality of cylinders 11 are formed. Each cylinder is provided with a piston 12 which is reciprocally mounted within cylinder 11 and is connected through a piston rod 13 to the engine crankshaft 14. The upper part of the engine block is provided with a head 16, the latter being fitted closely to the block to define an upper wall to the respective cylinders 11 and form within each cylinder a combustion chamber 17.

Head 16 is further provided with a plurality of valves 18 which are operated between opened and closed positions by a valve actuating means. While the latter is not specifically shown in the drawing such construction is well known in the prior art for operating the respective intake and exhaust valves in conjunction with the operation of the engine crankshaft.

Each combustion chamber 17 is provided with a fuel injector 19 which is in turn communicated to a fuel pump 20 which is capable of metering a desired amount of fuel to the respective combustion chambers in response to movement of the engine control means.

Each combustion chamber 17 as shown is provided as noted, with an intake as well as an exhaust valve 18. While only the exhaust valve is presently shown closed, the valve is positioned to operate such as to sequentially open and close exhaust valve port 21 in response to the position of reciprocating piston 12. Each valve 18 is provided with a valve head 22 from which an elongated valve stem 23 depends. The latter is positioned such that the valve head 22 is receivable in valve port 21 to form a substantially gas tight seal with the latter.

During the piston 12 exhaust stroke, as hot exhaust gases are discharged, exhaust valve 18 will be adjusted to the open position. Exhaust gases will thus be pushed from combustion chamber 17 as the piston moves toward the cylinder head 17. Said hot exhaust gases will be guided along the exhaust gas passage 24 and then received into exhaust manifold 26.

Exhaust manifold 26 as shown comprises a relatively elongated casing 27 which is adapted to be gas tightly fixed against a gasket, to the engine block and/or the engine head 16 to receive the hot exhaust gas stream from each of combustion chambers 17.

Because of the intensive heat of the exhaust gas stream, casing 27 is normally formed of steel, cast iron, or a similar heat resistant material. Basically the manifold 26 is formed with an outer wall, having a sufficient number of flanges 28 or other means whereby the manifold can be fastened to the engine block with gasketing or similar gas tight means therebetween.

One or both ends of the elongated casing 27 can be provided with a removal end piece 29 to permit the insertion or removal of filter media. Filter casing 27 as shown, extends a sufficient length along the engine 10 to receive hot exhaust gas streams from the respective combustion chambers 17 which are spaced longitudinally along the engine. The filter casing 27 defines generally an elongated reaction chamber 31 which is so constructed to exhibit a progressively larger cross section as the chamber progresses toward the manifold exhaust port 33.

This configuration of the internal reaction chamber is such as to accommodate the respective inflows of exhaust gas from each cylinder 17, as well as the inflow of coolant gas as will be hereinafter noted.

Inner wall 32 of manifold 27 includes a plurality of openings 34 which are disposed in alignment with the corresponding exhaust passages 24, which communicate with respective combustion chambers 17.

A filter bed 36 disposed within reaction chamber 31 can comprise a number of materials. Adapted to the present purpose is a bed formed of a shredded metal such as stainless steel or the like having sufficient heat resistance to permit passage of the hot exhaust gases at temperatures up to about 1500° F. Filter bed 36 substantially fills the elongated reaction chamber, and can be provided with support means such as screens 37 or the like disposed at the respective gas inlets and discharge ports whereby to maintain the filter media or bed 36 within reaction chamber 31.

Reaction chamber 31 is further provided with means for heating the incoming exhaust gas. Such means as presently shown includes at least one, and preferably a plurality of electrical heating elements 38. The latter are disposed within bed 36 to contact both the bed material, and the passing exhaust gas. Heaters 38, as shown, can be disposed adjacent to each inlet port 34 or opening of the manifold. Alternately, a single heater can be disposed at the furthest end of the manifold whereby to contact incoming exhaust gas from the end port 34 prior to the gas stream flowing through, and heating the filter bed 36.

Heater 38 is communicated through electrical conductor 39, to a source of electricity 35 preferably a battery or the like which forms a part of the automotive ignition system.

One or more thermal sensors 41 are disposed with their sensing heads within bed 36 and passing through the manifold 26 wall or casing. Each of said sensors 41 is adapted to continuously monitor the temperature within filter bed 36, and consequently the temperature of gas passing therethrough.

The cooling phase of the present system is embodied in a plurality of nozzles 42 which are mounted in manifold 27, having discharge openings within filter bed 36. The respective nozzle openings are disposed preferably adjacent to the respective exhaust ports 34. Thus, a cooling medium such as an inert gas can be injected to intercept and mix with incoming hot exhaust gas.

These nozzles 42 as shown, are disposed in a manner that each inlet receives an individual flow of coolant gas. Alternatively, the number of nozzles and their arrangement can be determined by the degree of cooling which is desired. For example, a single nozzle can be mounted at one end of filter bed 36, preferably adjacent to heater 38 at the filter remote end.

Each nozzle 42 is communicated with a source of the coolant gas 45, which can, as a practical matter, be air, or an inert gas such as nitrogen. The latter is directed from a pump 43, through the respective conduits 44 which communicate with each nozzle 42. In the present arrangement, pump means 43 is provided with its inlet communicated with a source of air or gas, the discharge thereof being communicated with a manifold arrangement which in turn meters air flow at a desired rate to the respective nozzles 44.

The control means 46 for actuating both heater 38 and the air injection system, is comprised of means powered by an electrical source which connects to both the heater 38 and the air pump 43. Thus, the thermal sensor 41 in its normal operation will monitor the temperature within filter bed 36 and in turn send a signal to the control means 46. The latter in turn will cause either the heater 38 or air pump 43 to be actuated, depending on the conditions of the load imposed on engine 10.

To provide most efficient operation, in one embodiment manifold 27 is insulated in its entirety with a coating 47 of a nonthermally conducted material particularly adapted to maintain heat within the reaction chamber. Said layer of insulating material can further be provided with a coating or enclosing jacket to maintain it in place.

Other modifications and variations of the invention as hereinbefore set forth can be made without departing from the spirit and scope thereof, and therefore, only such limitations should be imposed as are indicated in the appended claims.

I claim:

1. Filter (26) for an internal combustion engine (10) having at least one cylinder (11) which encloses a combustion chamber (17), the latter having intake and exhaust valves (18) communicated therewith, the engine having at least one exhaust valve port (34) through which a hot exhaust gas stream is passed carrying combustible particles, a casing (27) defining an elongated reaction chamber (31) having a progressively larger cross-section and having an inlet which communicates with said at least one exhaust gas port (34) to receive said exhaust gas stream therefrom, and said progressively larger reaction chamber (31) having an exhaust gas port (33) at the larger end thereof, a filter bed (36) disposed in said reaction chamber (31) positioned to contact said hot exhaust gas stream and thereby retain said combustible particles from the exhaust gas stream while passing the latter therethrough, injector means (42) communicated with a source of a gaseous coolant (45), and having at least one nozzle disposed within said filter bed (36), temperature control means (46) communicated with said injector means (42) and with said source of gaseous coolant (45), and being operable to regulate a flow of gaseous coolant into said filter bed (36).

2. An apparatus as defined in claim 1, including;

thermal sensor means (41) disposed within said filter bed (36) and communicated with said temperature control means (46), to monitor the temperature of the filter bed and to control actuation of the temperature control means (46).

3. An apparatus as defined in claim 1 wherein said internal combustion engine includes; a plurality of exhaust valve ports 34, said exhaust ports each opening into said casing reaction chamber 31, the latter being elongated and progressively increasing in cross-sectional area toward the filter bed downstream end.

4. An apparatus as defined in claim 2 including; heater means (38) disposed in said reaction chamber (31) and connected to said temperature control means (46), whereby the latter will regulate the operation of said heater means (38) within a predetermined range of filter bed temperatures.

5. An apparatus as defined in claim 1 wherein said engine includes a plurality of exhaust ports (34), and said injector means (42) includes; a plurality of nozzles disposed at spaced apart intervals within said filter bed (36), the respective injector means each having a nozzle disposed in substantial alignment with each of said exhaust gas ports (34).

6. An apparatus as defined in claim 1 wherein; said injector means 42 is communicated with a source of air.

7. An apparatus as defined in claim 1 wherein; at least a portion of said filter casing is disposed in heat exchange relationship with said internal combustion engine.

* * * * *